United States Patent [19]
Nelson et al.

[11] 4,353,395
[45] Oct. 12, 1982

[54] CUTTING AND WELDING TORCH VALVE APPARATUS

[75] Inventors: Craig E. Nelson, St. Paul; Frank T. Kawamoto, Minneapolis, both of Minn.

[73] Assignee: Tescom Corporation, Minneapolis, Minn.

[21] Appl. No.: 168,511

[22] Filed: Jul. 14, 1980

[51] Int. Cl.³ .............................................. F17D 3/01
[52] U.S. Cl. .................................... 137/861; 137/606; 137/881; 222/482; 239/416.2; 239/417.5; 251/86; 431/345
[58] Field of Search ............... 137/599, 605, 606, 861, 137/881, 246; 222/482; 251/86, 88; 239/413, 416.2, 417.5; 431/345, 344

[56] References Cited

U.S. PATENT DOCUMENTS

| | | | |
|---|---|---|---|
| 1,763,927 | 6/1930 | Ireland | 251/86 |
| 1,830,459 | 11/1931 | Austin et al. | 239/412 |
| 1,865,998 | 7/1932 | Abbott, Jr. | 251/86 |
| 2,031,163 | 2/1936 | Hughey | 239/424.5 |
| 2,198,342 | 4/1940 | Jacobsson et al. | 239/424.5 |
| 2,480,283 | 8/1949 | Blahut | 239/416.2 |
| 3,076,494 | 2/1963 | Wedan | 251/121 |

FOREIGN PATENT DOCUMENTS

| | | | |
|---|---|---|---|
| 933129 | 4/1948 | France | 251/86 |
| 476320 | 12/1952 | Italy | 251/86 |

*Primary Examiner*—George L. Walton
*Attorney, Agent, or Firm*—Clayton R. Johnson

[57] ABSTRACT

A torch having oxygen and fuel gas passages from the torch butt to the torch tip, and valving apparatus for controlling the flow of oxygen and fuel gas from fuel and oxygen adapters on the torch butt to said passages, the valving apparatus including a valve seat, a valve stem, a first ball retained in a valve stem bore for rotation relative to the valve stem and abuttable against the valve seat to block fluid flow therethrough while the valve stem is spaced from the valve seat and a second ball rotatably mounted in a valve stem bore to abut against the first ball axially opposite the valve seat, and lubricant for being transferred from the second ball to the first ball as the valve stem rotates relative the first ball and the first ball rotates relative to the second ball, the first ball being of a substantially larger diameter than the second ball.

6 Claims, 4 Drawing Figures

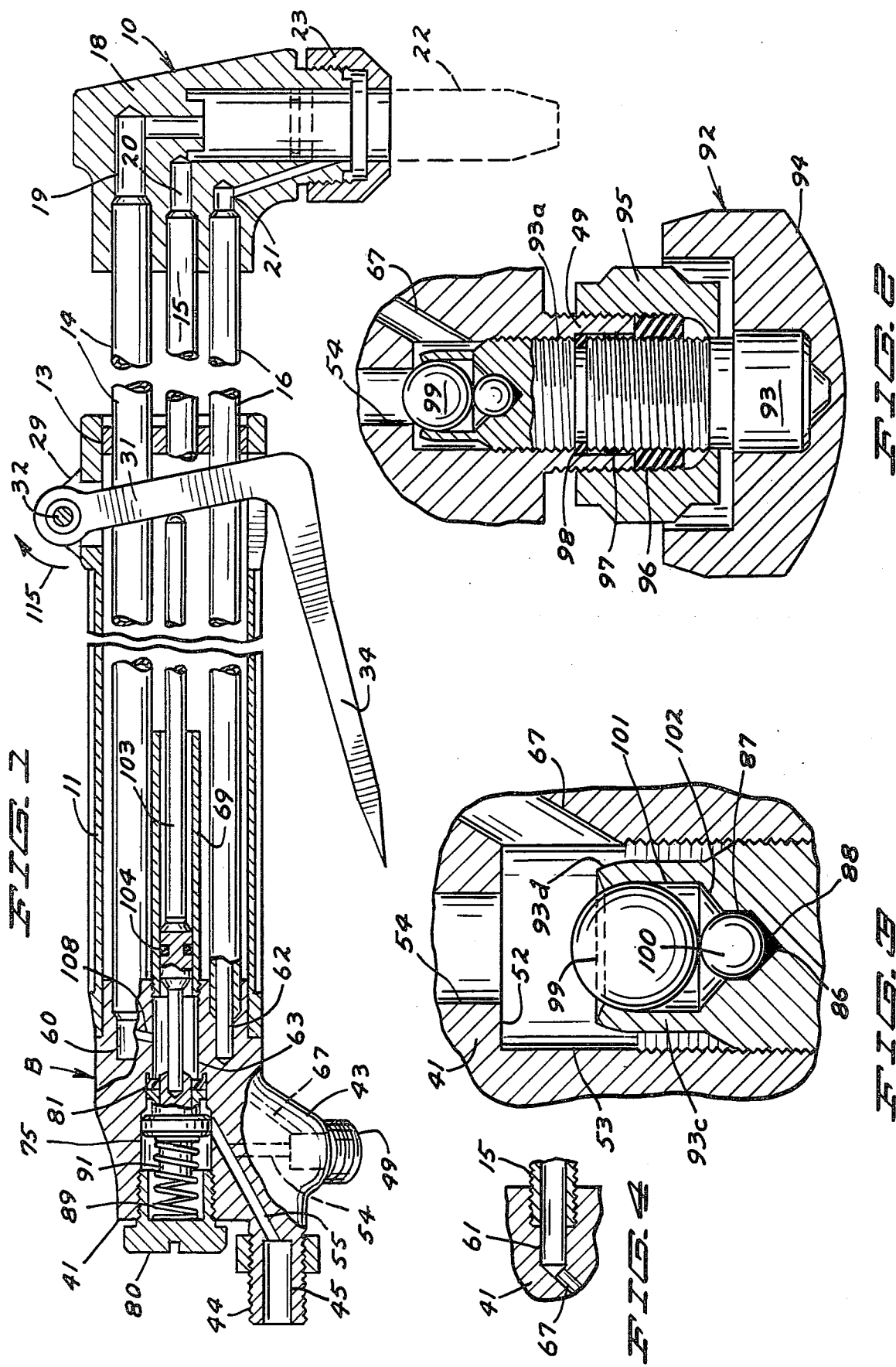

CUTTING AND WELDING TORCH VALVE APPARATUS

BACKGROUND OF THE INVENTION

Valving apparatus for cutting and welding torches.

In U.S. Pat. No. 3,076,494 there is disclosed a needle valve stem subassembly that includes a ball seatable against an annular valve seat to block fluid flow therethrough. However, due to galling and etc., the cyclic life of such prior art valving apparatus prior to it no longer providing a satisfactory fluid seal is shorter than desired. In order to increase the cycle life of valving apparatus, this invention has been made.

SUMMARY OF THE INVENTION

Valving apparatus that includes a valve body having a first bore opening to a larger diameter second bore to provide an annular valve seat, and a valve stem subassembly mountable on the valve body that includes a valve steam, a first ball rotatably retained in a valve stem bore for abutting against the valve seat to block fluid flow between the valve body bores while retaining the valve stem spaced from the valve seat, and a second ball of a smaller diameter rotatably in a valve stem bore in abutting relationship to the first ball axially opposite the valve seat. Preferrably lubricant is provided in the valve stem for being transferred by rotation of the second ball to the first ball.

An object of this invention is to provide new and novel valving apparatus to obtain increased cycle life of the valve stem subassembly prior to substantial leakage occurring between the subassembly and the valve seat in a valve closed position.

BRIEF DESCRIPTION OF THE DRAWINGS

FIG. 1 is a fragmentary vertical sectional view of a cutting torch assembly having the valving apparatus of this invention, various parts of said view being broken away;

FIG. 2 is an enlarged fragmentary sectional view showing the valving apparatus of this invention in a closed condition;

FIG. 3 is a further enlarged fragmentary sectional view showing the valving apparatus in an opened condition; and FIG. 4 is a fragmentary sectional view showing a portion of the oxygen passageway.

Referring now in particular to FIG. 1, there is illustrated a cutting torch, generally designated 10, that includes a handle tube 11. Mounted in the front portion of the handle tube is a front plate 13 having three vertically spaced apertures therein for retaining the fluid conduits 14–16, inclusive, in proper spaced relationship, conduit 14 being for cutting oxygen, conduit 15 being for preheat oxygen, and conduit 16 being for fuel gas. The aforementioned conduits 14, 15, and 16 have their front ends secured in a conventional torch head 18 in fluid communication with appropriate fluid channels formed in the torch tip by passages 19, 20 and 21 respectively. The torch tip is retained in the torch head by head nut 23. Since the tip is of a conventional design, it will not be described.

A pair of transversely spaced upwardly projecting ears 29 are formed on the handle tube. One ends of arms 31 of a bifurcated hand lever 34 extends upwardly through slots in the handle tube and are rotatably mounted on a lever pin 32 which in turn is mounted by ears 29.

The torch includes a torch butt B that is mounted on the rear end of the handle tube, said butt including a main body portion 41. Formed integral with the main body portion are the oxygen bifurcated valve portion 43 and the fuel gas bifurcated valve portion (not shown). Portion 43 has an adapter part 44 which is adapted to be fluidly connected to an oxygen line (not shown) to a high pressure source of oxygen (not shown). The adapter part has a bore 45. Similarly, the fuel gas bifurcated valve portion is provided with an adapter part (not shown) for being fluidly connected to a supply of suitable fuel gas, such as acetylene (not shown).

The torch butt is also provided with a cutting oxygen outlet port 60, a preheat oxygen outlet port 61, and a fuel outlet port 62, which, respectively, have the rear end of the conduits 14, 15 and 16 mounted therein. Further, the torch butt has a push rod port 63 that mounts the rear end of a push rod tube 69, port 63 opening to a valve bore 75. A back cap 80 is threaded into the rear portion of valve bore 75, there being an O-ring (not shown) between the head of the back cap 80 and the torch butt to provide a fluid seal. One end of a coil spring 89 seats against the back cap while an opposite end thereof bears against an enlarged diametric portion of a seat retainer 91 to constantly urge the retainer in a forward direction. The seat retainer includes a valve abutable against the valve seat 81 to block fluid flow from bore 75 to port 63 when the seat retainer is in its forewardmost position.

In order to move the seat retainer against the resilient action of spring 89 to a position to permit fluid flow from bore 75 to port 63, there is provided a push rod 103 having its rearward end secured to seat retainer. The push rod extends through the push rod tube and has an O-ring 104 thereon to form a fluid seal with the push rod tube. The forward end of the push rod abuts against an arm 31 so that as the hand lever is pivoted in the direction of the arrow 115, the push rod is moved in a direction to move the seat retainer to a valve open position to permit fluid flow from bore 75 into port 63. Since, for the most part, the construction and operation of the previously mentioned portions of the torch is the same as that set forth in U.S. Pat. No. 3,076,494, they will not be described in greater detail herein. However, to the extent necessary, the aforementioned patent is incorporated herein by reference.

The bifurcated valve portion 43 is constructed to in part form a valve body having a valve bore 53 that opens outwardly through a threaded nipple 49. The juncture of the inner end of bore 53 with oxygen passageway 54 provides an annular valve seat 52, the inner end of bore 53 being of a larger diameter than the adjacent end of passageway 54 and axially aligned therewith. Bore 53 is also fluidly connected to preheat oxygen port 61 by an oxygen passageway 67 while oxygen passageway 54 fluidly connects bore 53 to oxygen channel 55. Oxygen channel 55 fluidly connects bore 45 to bore 75.

To permit fluid flow from oxygen passageway 54 to the oxygen passageway 67, and alternately prevent fluid flow between said passageways, there is provided a valve stem subassembly generally designated 92 (see FIG. 2). The valve stem subassembly includes an axially elongated valve stem 93 having a knob 94 secured to the outer end thereof for rotating the valve stem. An axially intermediate portion 93a of the valve stem is threaded to form a mating fit with the adjacent threaded portion of the bore 53. The valve stem is rotatably extended through a packing nut 95 which in turn is threadedly mounted on the nipple 49. Packing 96 is provided in the packing nut for forming a fluid seal between the valve stem, the packing nut and the outer annular edge of the nipple. Further, a packing washer 97 is provided on the valve stem inwardly of packing 96, while a snap ring 98 is seated in a groove in the valve stem inwardly of the packing washer for limiting outward movement of the valve stem relative the valve bore 53 to block removal of the valve stem from the torch butt when the packing nut is threadedly secured to the nipple.

The inner end portion of the valve stem is provided with an axial extending bore 101 which is of a greater transverse diameter than the axial length thereof. The outer end of bore 101 opens to the major base end of the frusto-conical bore 102, the minor base end of bore 102 opening to a cylindrical bore 87, which is of a substantially smaller transverse diameter than the diameter of bore 101. The opposite end of bore 87 opens to conical bore 88. The transverse diameter of bore 87 is greater than the axial length thereof.

Mounted in bore 87 is a spherical ball 100, the ball being of a diameter to form a close rotating fit with the wall defining bore 87 and to extend into bores 88, 102. Movement of ball 100 in one axial direction is blocked by the ball abutting against the wall defining bore 88. A substantially larger diameter spherical ball 99 is mounted in bore 101 and is retained in butting relationship therewith by the inner (terminal) annular edge portion 93d of valve stem flange 93c being crimped at 93d. The crimping is such that the ball 99 is freely rotatable in the valve stem and at the same time retain ball 99 in abutting relationship to ball 100. As may be noted in FIG. 3, ball 99 is of a diameter to extend axially inwardly of flange 93c, of a diameter substantially larger than the diameter of passage 54 adjacent bore 53 and of a substantially smaller diameter than bore 53. The center axes of bores 53, 87, 88, 102 and 101, valve seat 52 and the end portion of passage 54 that opens through the valve seat are axially aligned. Thus, ball 100 abuts against ball 99 axially opposite the valve seat to block ball 99 moving axially away from the flange crimped portion while permitting the balls rotating relative one another and the valve stem. Further, bores 87 and 101 are of diameters to prevent any significant transverse movement of balls 100 and 99 respectively.

As may be noted in FIG. 2, the ball 99 is of a diameter to be seatable against the valve seat 52 to block fluid flow from passageway 54 to bore 53, while the terminal annular edge of the flange 93c is axially spaced from the valve seat 52. Further, the maximum outer diameter of flange 93 is sufficiently smaller than the transverse diameter of the inner end of bore 53 to provide an annular clearance space between the adjacent part of the torch butt wall defining said bore and the outer circumferential surface of the flange. Oxygen passageway 67 opens to the aforementioned clearance space whereby the ball 99 being moved only a slight amount out from abutting relationship with the valve seat, oxygen can flow from passage 54 to the clearance space and then into passageway 67.

Lubricant 86 is provided in bores 87, 88 and 102 whereby as ball 99 rotates in contact with ball 100, the rotation of ball 100 transfers lubricant to the ball 99. As the valving apparatus for controlling the flow of fuel gas from the torch butt adapter connection for the fuel gas supply line to port 62 is the same as that shown and described with reference to FIGS. 2 and 3, it will not be described herein.

In using the torch, with oxygen under pressure in bore 45, oxygen can flow through passageway 55 into bore 75, however cannot flow into port 63 since lever 34 is in its off position. Upon turning knob 94 of oxygen control valve 92 in the appropriate direction, the valve stem is moved the desired amount from its FIG. 2 position to its FIG. 3 position to permit oxygen under pressure flowing through passage 54, into bore 53 and then through passage 67 into port 61 and thence through conduit 15 to the torch tip. The amount of opening of the valve stem will determine the pressure of preheat oxygen at the torch tip. Likewise, the fuel gas valve stem is adjusted for providing fuel gas to the torch tip.

As ball 99 initially moves into contact with the valve seat the turning of knob 94 results in the valve stem rotating relative ball 99 and ball 99 rotating in bore 87 relative ball 100. The resulting rotation of ball 100 transfers lubricant from bore 88 (and/or bores 87 and 102) to ball 99.

When it is desired to apply cutting oxygen to the torch tip, lever 34 is pivoted in the direction of arrow 115 which moves the push rod 103 rearwardly to move the seat retainer off the valve seat 81. As a result, oxygen flows from bore 75 into port 63 and then through port 108 to port 60 whereby it can flow through conduit 14 and subsequently to the torch tip.

The torch butt is made of brass while the balls 99, 100 are made of stainless steel. However it is to be understood the invention is applicable to apparatus where the torch butt is made of a material that is harder or softer than the material from which the balls are made. In the prior art when there is only a single ball provided, such as disclosed in U.S. Pat. No. 3,076,494, and the valve stem flange was crimped to prevent the ball from rotating, the approximate cycle of life (number of times of opening and closing the valve) prior to galling of the valve seat so that leakage occurred is about 100–150 times. However with present invention the cycle life has been increased to over 3500 times. With the usage of balls 99, 100 but without the lubricant 86, the cycle life is about 1,000–1,500 times. Thus, by mounting ball 99 such that the valve stem can rotate relative thereto when the ball 99 is abutting against the valve seat 52 and the ball 100 rotates relative to ball 99, the cycle life of the valve stem assembly has been substantially increased. Even though it is preferred that ball 99 be about twice the diameter of ball 100, ball 100 may be of a diameter that is equal to or smaller than the diameter of ball 99. If ball 100 is too small, the large increase in cyclic life is not obtained.

What is claimed is:

1. Torch apparatus having a torch head, a torch tip mounted in said torch head, said torch head having at least two fluid passages formed therein to open into the torch tip, a torch butt having at least two fluid channels formed therein, a fluid conduit portion for each fluid channel interconnecting a fluid channel with a fluid passage, one of said fluid channels including an inlet passage, an outlet passage opening to one of the fluid conduit portions, and a valve bore opening to the inlet and outlet passages, the valve bore and one of the inlet and outlet passages being of a size and shape to cooperatively form a valve seat at its opening to the valve bore, and a valve stem subassembly that is mounted on the torch butt to extend into the valve bore and operative between an open position spaced from the valve seat to permit fluid flow through the valve bore between the inlet and outlet passages and a closed position abutting against the valve seat to block fluid flow through the valve bore between the inlet and outlet passages, the subassembly including an axially elongated valve stem having a terminal annular edge adjacent the valve seat, a first bore potion opening through the terminal edge toward the valve seat, a second bore portion opening to the first bore portion axially opposite the first bore portion from the terminal edge, a first ball rotatably mounted by the valve stem to extend within the first bore portion and have a minor portion thereof extending away from the terminal edge toward the valve seat that will block fluid flow through the valve seat when the subassembly is in its closed position with the first ball abutting against the valve seat, and a second ball rotatably mounted in the second bore portion and extending into abutting relationship with the first ball to block axial movement of the first ball relative the valve stem in a direction away from the valve seat while permitting rotation of the first ball relative thereto and relative the valve stem, the first and second bore portions being of diameters to block any significant transverse movement of the first and second balls respectively.

2. The apparatus of claim 1 further characterized in that the second ball is of a diameter equal to or smaller than the diameter of the first ball.

3. The apparatus of claim 1 further characterized in that the first and second bore portions have central axes aligned with each other and with the valve bore central axis, that the first bore portion at least axially adjacent the second bore portion is of a substantially larger transverse diameter than the transverse diameter of the second bore portion and that the first ball is of a substantially larger diameter than the second ball.

4. The apparatus of claim 3 further characterized in that the first ball is of a diameter about twice that of the second ball.

5. The apparatus of claim 3 further characterized in that the balls and bore portions are of relative diameters to block any significant transverse movement of the balls relative the valve stem while permitting rotation of the balls relative one another and relative to the valve stem.

6. The apparatus of claim 3 further characterized in that the valve stem has a third bore portion opening to the second bore portion axially remote from the first bore portion and that a lubricant is provided in the third bore portion to be transferred to the first ball when the balls rotate relative one another.

* * * * *